US011232459B1

(12) United States Patent
Abdulla et al.

(10) Patent No.: US 11,232,459 B1
(45) Date of Patent: *Jan. 25, 2022

(54) CONTROL GROUP DATASET OPTIMIZATION

(71) Applicant: MASTERCARD INTERNATIONAL INCORPORATED, Purchase, NY (US)

(72) Inventors: Muhammad Abdulla, Lanham, MD (US); Christopher Jung, Falls Church, VA (US); Ethan Koenig, Rochester, NY (US); Nicholas Sidaway, Washington, DC (US); Alexandr Svistunov, Arlington, VA (US); Dustin Tiedemann, Arlington, VA (US); Briana Whelan, Palo Alto, CA (US); Jordan Zink, Arlington, VA (US); Geoffrey Patterson, Washington, DC (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 292 days.

This patent is subject to a terminal disclaimer.

(21) Appl. No.: 16/446,483

(22) Filed: Jun. 19, 2019

Related U.S. Application Data (63) Continuation of application No. 15/462,522, filed on Mar. 17, 2017, now Pat. No. 10,395,259.

(51) Int. Cl.
*G06F 16/20* (2019.01)
*G06Q 30/02* (2012.01)

(52) U.S. Cl.
CPC ............. *G06Q 30/02* (2013.01); *G06F 16/20* (2019.01)

(58) Field of Classification Search
None
See application file for complete search history.

(56) References Cited

U.S. PATENT DOCUMENTS

| 5,426,780 | A  | * | 6/1995 | Gerull ................... G06F 16/289 707/748 |
| 7,398,201 | B2 | * | 7/2008 | Marchisio ............... G06F 40/35 704/9 |
| 7,552,055 | B2 | * | 6/2009 | Lecoeuche .......... H04M 3/4938 704/270.1 |

(Continued)

*Primary Examiner* — Kim T Nguyen
(74) *Attorney, Agent, or Firm* — Foley & Lardner LLP (57) ABSTRACT

Disclosed herein are systems and methods for an analytics server to efficiently generate a control group dataset, including receiving, by the analytics server, a request to generate a control group dataset based on a test dataset and potential control dataset; generating, by the analytics server, an instruction to receive a first dataset based on the request; identifying, by the analytics server, data points within the first dataset corresponding to a number of users and user attributes; generating, by the analytics server, a second dataset by normalizing the user attributes; generating, by the analytics server, a third dataset comprising a space-filling curve, where each space-filling curve data point corresponds to the normalized user attributes and the number of users; determining, by the analytics server, control users by matching the space-filling curve data points with the user attribute; and generating, by the analytics server, an instruction for display on a client device.

20 Claims, 5 Drawing Sheets

(56) References Cited

U.S. PATENT DOCUMENTS

| | | | |
|---|---|---|---|
| 7,987,177 B2 * | 7/2011 | Beyer | G06F 16/2462 |
| | | | 707/713 |
| 2007/0055658 A1 * | 3/2007 | Hsiao | G06F 16/24534 |
| 2011/0218737 A1 * | 9/2011 | Gulati | G06T 15/00 |
| | | | 702/16 |
| 2011/0221599 A1 * | 9/2011 | Hogasten | H01L 27/14609 |
| | | | 340/632 |
| 2011/0295510 A1 * | 12/2011 | Gulati | G01V 1/288 |
| | | | 702/16 |
| 2014/0139643 A1 * | 5/2014 | Hogasten | H04N 5/33 |
| | | | 348/48 |
| 2014/0149175 A1 * | 5/2014 | Abbott | G06Q 10/0635 |
| | | | 705/7.28 |

* cited by examiner

| X: | 0<br>000 | 1<br>001 | 2<br>010 | 3<br>011 | 4<br>100 | 5<br>101 | 6<br>110 | 7<br>111 |
|---|---|---|---|---|---|---|---|---|
| Y: 0<br>000 | 000000 | 000001 | 000100 | 000101 | 010000 | 010001 | 010100 | 010101 |
| 0<br>001 | 000010 | 000011 | 000110 | 000111 | 010010 | 010011 | 010110 | 010111 |
| 2<br>010 | 001000 | 001001 | 001100 | 001101 | 011000 | 011001 | 011100 | 011101 |
| 3<br>011 | 001010 | 001011 | 001110 | 001111 | 011010 | 011011 | 011110 | 011111 |
| 4<br>100 | 100000 | 100001 | 100100 | 100101 | 110000 | 110001 | 110100 | 110101 |
| 5<br>101 | 100010 | 100011 | 100110 | 100111 | 110010 | 110011 | 110110 | 110111 |
| 6<br>110 | 101000 | 101001 | 101100 | 101101 | 111000 | 111001 | 111100 | 111101 |
| 7<br>111 | 101010 | 101011 | 101110 | 101111 | 111010 | 111011 | 111110 | 111111 |

CONTROL GROUP DATASET OPTIMIZATION

CROSS REFERENCE TO RELATED APPLICATIONS

This application is a continuation application of U.S. patent application Ser. No. 15/462,522, filed Mar. 17, 2017, which is incorporated by reference herein in its entirety.

TECHNICAL FIELD

This application relates generally to generating and manipulating datasets associated with efficient analytics processing.

BACKGROUND

Businesses are increasingly using testing in order to learn about an initiative's effectiveness. The businesses will try an idea on a subset of the customers (e.g., test group) and analyze the customer performance within the test group in comparison to the customer performance of the rest of the customers who did not receive the treatment idea (e.g., potential control dataset). In one conventional example, the business is a retailer, and the test group is a set of customers who received a promotional service. The business in this example, may study the behavior of the customers within the test group to customers who did not receive the promotional service. Conventionally, analyzing the customer behavior has been accomplished using a "brute force" method of comparing the test group customers to every customer who did not receive the treatment. However, the number of customers within this potential control dataset may be very high, which may make analysis burdensome and tedious. Furthermore, studying the behavior of the potential control group customers may not be as beneficial if they do not resemble the customers within the test dataset.

As the processing power of computers allow for greater computer functionality and the Internet technology era allows for interconnectivity between computing systems, many institutions use computers to generate control group datasets. However, since the implementation of these more sophisticated online tools, several shortcomings in these technologies have been identified and have created a new set of challenges. Existing and conventional methods fail to provide fast and efficient analysis due to a high volume of customer information existing on different networks and computing infrastructures. Managing such information on different platforms is difficult due to number, size, content, or relationships of the data associated with the customers. For example, for a customer potential control dataset of only 100,000 customers, there may be an extremely high number of different combinations of control customers who may or may not resemble the customers within the test dataset. Conventional methods may take hours or even days to complete the analysis because there is often not enough processing power and time to search the entire potential control dataset or generate an optimized control dataset (e.g., a subset of the potential control dataset, which resembles the test dataset). As a result, existing and conventional methods also produce incomplete and inaccurate results.

SUMMARY

For the aforementioned reasons, there is a need for a more efficient and faster system and method for processing large test and control datasets, which would allow institutions to optimize the control group (e.g., create a better test to control comparison, determine a control group from the potential control customers that more closely resembles a test dataset) and study customer behavior in a more efficient manner than possible with human-intervention or conventional computer data-driven analysis. There is a need for a network and computer-specific set of rules to produce efficient and accurate results when facing a high number of combinations for control group datasets. These features allow performing large work such as time-consuming analysis, and generating custom control group datasets, in a more efficient manner by using less computing power than other approaches.

Disclosed herein are systems and methods capable of addressing the above-described technical shortcomings. In an embodiment, a method comprises receiving, by a server from a user interface, a request to generate a control dataset, wherein the control dataset is a subset of a potential control dataset and representative of a test dataset comprising a test user attribute, corresponding test user, and a potential control dataset number, wherein the received request comprises at least one of a control user attribute and a control dataset number; generating, by the server, a first instruction to receive a first dataset comprising at least one of the potential control dataset number, test user attribute, corresponding test user, and the control attribute; receiving, by the server, the first dataset upon transmitting the first instruction to a first database; identifying, by the server, a plurality of first dataset data points, wherein each first dataset data point corresponds to the test user and the control user attribute; generating, by the server, a second dataset comprising a plurality of second dataset data points, wherein each second dataset data point is generated by normalizing the control user attribute within the first dataset and corresponds to a test user within the first dataset; generating, by the server, a third dataset comprising a space-filling curve, wherein each space-filling curve data point corresponds to each normalized control user attribute within the second dataset and the number of test users within the first dataset; determining, by the server, a plurality of control user data points by determining space-filling curve data points matching with the control user attribute within the received request; and generating, by the server, a second instruction to the user interface to display the plurality of control user data points.

In another embodiment, a computer system comprises a server, which is configured to receive from a user interface, a request to generate a control dataset, wherein the control dataset is a subset of a potential control dataset and representative of a test dataset comprising a test user attribute, corresponding test user, and a potential control dataset number, wherein the received request comprises at least one of a control user attribute and a control dataset number. The server is further configured to generate a first instruction to receive a first dataset comprising at least one of the potential control dataset number, test user attribute, corresponding test user, and the control attribute; receive the first dataset upon transmitting the first instruction to a first database; identify a plurality of first dataset data points, wherein each first dataset data point corresponds to the test user and the control user attribute; generate a second dataset comprising a plurality of second dataset data points, wherein each second dataset data point is generated by normalizing the control user attribute within the first dataset and corresponds to a test user within the first dataset; generate a third dataset comprising a space-filling curve, wherein each space-filling curve data point corresponds to each normalized control user attribute within the second dataset and the number of test users within the first dataset; determine a plurality of control user data points by determining space-filling curve data points matching with the control user attribute within the received request; and generate a second instruction to the user interface to display the plurality of control user data points.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Figure 1:
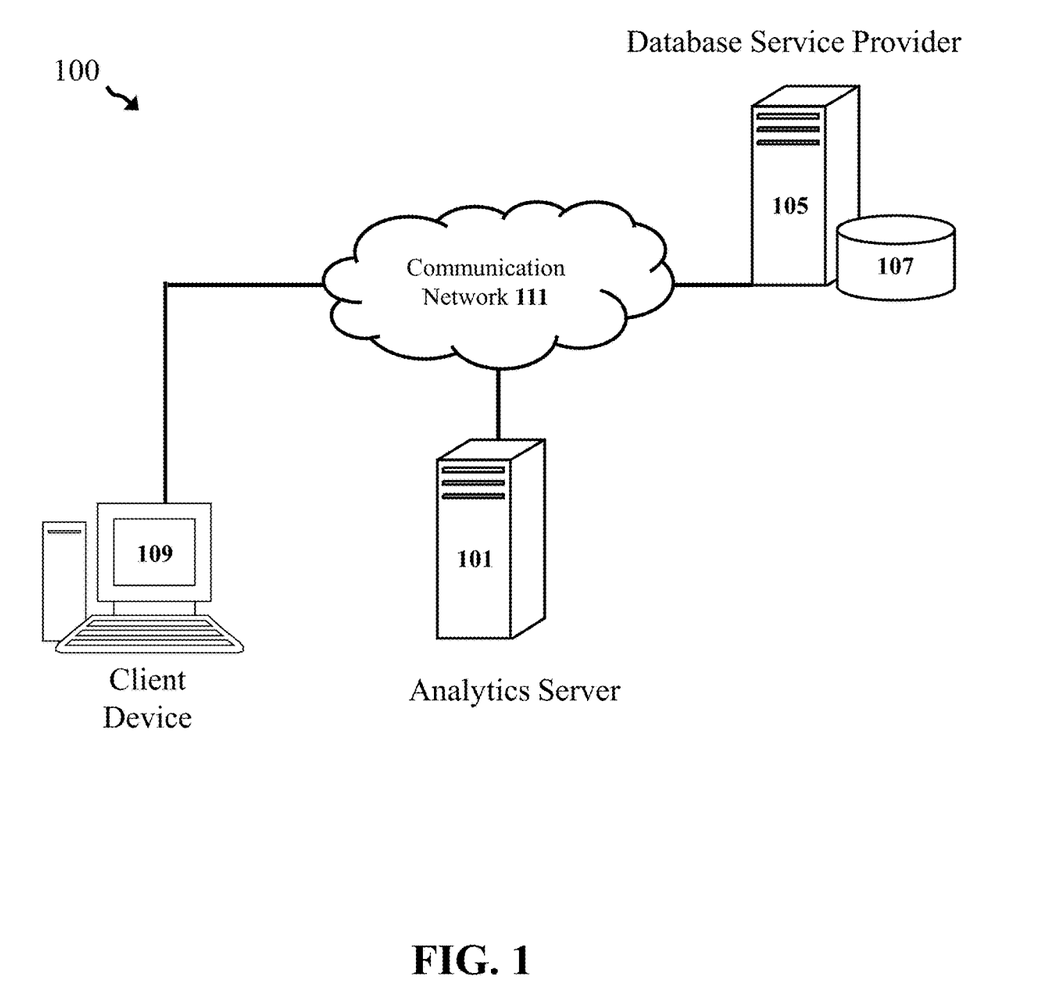
FIG. 1 illustrates an example of a system for generating an optimized control group dataset, according to an embodiment.

FIG. 1 illustrates components of a system 100, according to an exemplary embodiment. The system 100 comprises an analytics server 101, a database server 105 and a database 107 of a database service provider, and a client device 109. The client device 109 may communicate with the database server 105 via the communication network 111, such as the Internet. Likewise, the database server 105 may also communicate with the analytics server 101 via the communication network 111.

In operation, the client device 109 may request the data analytics server to derive various forms of analytical information from the data records of the database service provider. The database 107 may store data records that are associated with customer interactions, where the data records each contain at least one field identifying which customer or customer account was associated with a particular interaction. The database 107 may also record other customer information such as sales volume, sales amount, frequency of interactions, customer attributes (e.g., tenure, age, purchase power, demographics data) and the like. The database 107 may store data records generated and stored by a database server 105 during online interactions with the client device 109 when executing a web-application or a service accessed by the customer. The database 107 may be hosted on any number of computing devices comprising a non-transitory machine-readable storage medium capable of storing data records received from the database server 105, and in some cases, received from the analytics server 101, the client device 109, or other computing devices (e.g., point-of-sale systems, public websites). The database 107 may further comprise a processor capable of executing various queries and data record management processes, according to instructions from the analytics server 101 or the database server 105. One having skill in the art would appreciate that the database 107 may be the same computing device as the database server 105, or be hosted on a distinct computing device that is in networked-communication with the analytics server 101.

The analytics server 101 may perform various analytics on data records stored in the database 107 and transmit the results to the client device 109. The analytics server 101 may be any computing device comprising a processor capable of performing the various tasks and processes described herein. Non-limiting examples of the analytics server 101 may include a server, desktop, laptop, tablet, and the like. The analytics server 101 comprises any number of computer-networking components, which facilitate inter-device communications via the communication network 111. One having skill in the art would appreciate that there may be any number of distinct computing devices functioning as the analytics server 101 in a distributed computing environment.

The database server 105 may communicate data records and instructions to and from the analytics server 101, where the data records may be stored into the database 107 and where various analytics may be performed on the data by the database server 105 in accordance with the instructions from the analytics server 101 or the client device 109. The database server 105 may be any computing device comprising a processor capable of performing the various tasks and processes described herein. Non-limiting examples of a database server 105 may include a server, desktop, laptop, tablet, and the like. The database server 105 comprises any number of computer-networking components (e.g., network interface card) that facilitate inter-device communications via the communication network 111. One having skill in the art would appreciate that there may be any number of distinct computing devices functioning as the database server 105 in a distributed computing environment. The database server 105 may host an online service, such as cloud-computing application service, an online shopping site, or any other service that provide customer-facing web-based applications that collect customer data through web-based transactions with the client device 109 over one or more networks such as the communication network 111.

A client device 109 may access a web-based service or application hosted by a database server 105, from which customers may provide various types of personal and/or confidential data that may be stored in the database 107. The client device 109 may be any computing device comprising a processor capable of performing the various tasks and processes described herein. Non-limiting examples of a client device 109 may include a server, desktop, laptop, tablet, and the like. The client device 109 comprises any number of computer-networking components (e.g., network interface card) that facilitate inter-device communications via the communication network 111.

Figure 2:
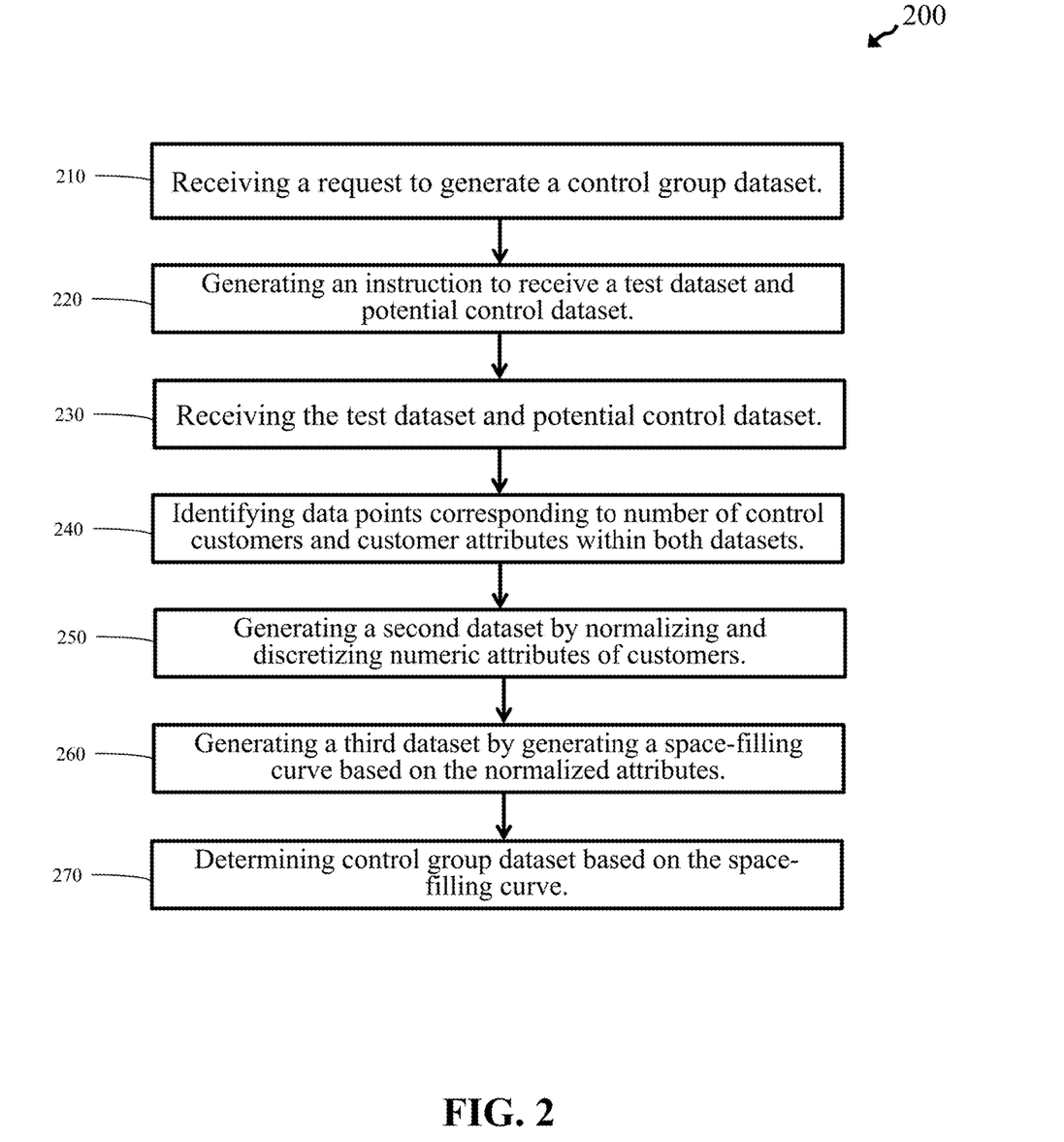
FIG. 2 illustrates a flowchart depicting operational steps of a method for generating a control group dataset, according to an embodiment.

Referring now to FIG. 2, a flowchart depicting operational steps of a method for optimizing a control group dataset is illustrated in accordance with an embodiment. Steps of the method 200 may be implemented using one or more modules of the data analytics server, the client device, and the database service provider. FIG. 2 does not imply any limitations with regard to the environments or embodiments that may be implemented. Modifications to the depicted environment or embodiment shown in FIG. 2 may be made.

At step 210, the analytics server may receive a request to generate a control group dataset. In some embodiments, the analytics server may receive this request from a client interacting with a user interface associated with the client device. In some other embodiments, the client request may be electronically inputted or transmitted to the analytics server using the communication network. The client request may comprise a request to generate a control group dataset based on a test group dataset and a potential control group dataset. The client request may further comprise information about a test dataset (e.g., a test strategy, test users numbers, customer attributes, and the like) and a request to generate a subset of the potential control group dataset (e.g., control group dataset) based on a set of customer attributes (e.g., control attributes). In some embodiments, the client request may comprise a request to generate a control group dataset, which is a subset of a potential control dataset and resembles the test dataset. The client interacting with a user interface associated with the client device may be a client who is a business owner and would like to identify a control group. A test strategy may be a promotional strategy such as sending coupons to various customers based on various criteria (e.g., customer attributes such as purchase power, age, previous purchases, and the like). Sending coupons may be a promotional tool to attract more customers. The client request may inquire about a subset of the potential control group (e.g., control group) who satisfy certain attributes. For example, the client request may identify a test strategy, in which 10,000 customers received coupons based on their previous purchases and tenure (e.g., how long they have been a member of the client's business) and request a subset of 100 customer who satisfy a new set of criteria (e.g., customers who have not received the coupon, have spent $100 in the past month at client's business, and have a tenure of 2 years). In some embodiments, the criteria for the control group and the test group may be the same.

A record of the test strategy and customer information may be collected by the database service provider, which is in communication with the client device. Customer attributes are any attributes associated with the customers and may be divided into two distinct categories of numeric and coded. A numeric attribute is an attribute easily identifiable with a number/integer. Non-limiting examples of a numeric attribute may include monthly purchase amount, units purchased, tenure, and the like. A coded attribute is an attribute, which may not be readily identifiable with a number. Non-limiting examples of a coded attribute may include age groups, income level, state of residency, payment type (e.g., credit card, debit card, online payment), and the like.

At step 220, the analytics server may generate an instruction to receive a potential control dataset and/or a test dataset from the database service provider. The potential control dataset and the test dataset may refer to all the information pertinent to customers selected for the test strategy. The database service provider may collect information regarding the type of coupons received by the customers, whether the coupons were presented, the amount spent by the customer, and other information associated with the customer attributes. The analytics server may generate the instruction based on the client request received from the client device. For example, the attributes requested by the analytics server may, in some embodiments, match the attributes used within the test strategy. The analytics server may transmit the instruction to database server of the database service provider. Upon the transmittal of the instruction to the database server, at step 230, the analytics server may receive the potential control dataset and/or the test dataset comprising all the customer information, attributes, test strategy, and other pertinent information indicated within the client request. A person skilled in the relevant art will appreciate that in some other embodiments, all the pertinent information regarding the test strategy may be received from the client request.

At step 240, the analytics server may identify customer data points within the potential control dataset and the test dataset. In some embodiments, the customer data points may refer to different attributes corresponding to one or more customers within the test dataset and/or the potential control dataset. In some embodiments, a customer data point may refer to a simple coordinate, which corresponds to a customer and an attribute associated with the customer. For example, the analytics server may organize the potential control dataset based on the customer attributes. In some embodiments, the analytics server may represent the organized data utilizing a graphic chart such as the chart represented in FIG. 3. In some embodiments, the analytics server may generate an instruction to display the graph on the client device. This organization may be used to show a distribution of the customers within the test strategy on the user interface associated with the client device.

Figure 3:
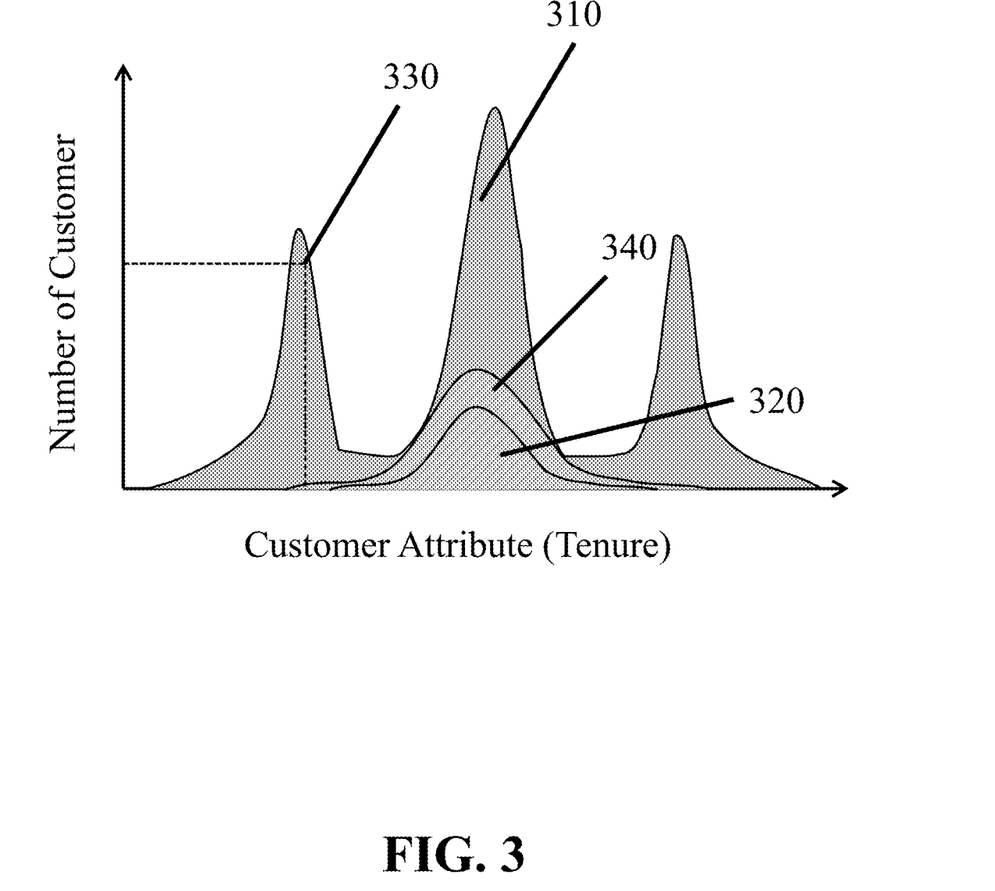
FIG. 3 illustrates distribution of user data points within a potential control dataset, according to an embodiment.

FIG. 3 illustrates distribution of customer data points within the potential control dataset, according to an embodiment. The X-axis in the graph illustrated in FIG. 3 represents a customer attribute, and the Y-axis represents a number of customers. In this embodiment, the customer attribute is tenure. The analytics server may organize the data points received within the potential control dataset and represent them in a graphical form. Function 310 represents a potential control dataset; each data point within the function 310, represents a number of customers with certain tenure. For example, data point 330 represents number of customers who have been associated with the client's business for 2 years and have received a coupon (e.g., the coupon distributed as part of the test strategy). The total number of customers involved in a control pool dataset may be calculated by determining the area under the function 310. Function 320 represents the control group dataset, which may resemble the same distribution as the test dataset 340. As illustrated by functions 320 and 340, the analytics server may generate a control group dataset similarly distributed as the test dataset across one or more attributes or generate the control group dataset based on new attributes from the client request.

At step 250, analytics server may generate a second dataset by normalizing and discretizing the numeric attributes of the customers within the potential control dataset. The analytics server may normalize the data in order to unify the entire customer attributes for ease of comparison. Normalization, as used herein, is to transform the data into a uniform range. The analytics server may use a variety of different techniques and methods to normalize the numeric attributes. In an embodiment, the analytics server may normalize the numeric attributes by stretching the numeric attribute values using a variance-and-mean method to normalize all the numeric attributes to a range of [0 to 1]. The analytics server may also discretize the numeric attribute values by casting double/float values to integer values and rounding to the nearest integer. Casting may refer to different ways of changing an entity of one data type into another. For example, the analytics server may cast numeric attribute values as an integer. An integer is a data type, which represents some finite subset of the mathematical integers (e.g., whole numbers). The analytics server may cast a numeric attribute as an integer data type and assign 2 or 4 bytes to the integer data type. Upon normalizing, the analytics server may change that data type to a float type or a double/float type. A float data type is stored as a four-byte, single-precision, floating-point number. An example would be the conversion of an integer value into a floating-point value. The term floating point refers to the fact that a number's radix point (decimal point, or, more commonly in computers, binary point) can "float"; that is, it may be placed anywhere relative to the significant digits of the number. For example, tenure of 7.8 years is a float data type because it has a floating point. The analytics server may cast (e.g., change the data type) to an integer data type and then round the 7.8 year to 8 years. The analytics server may also cast any attribute as a "bigint" (e.g., an integer using 8 bytes or 64 bits). The analytics server may also assign a fixed number of bits to each attribute. Casting while normalizing the numeric attribute may be performed in order to achieve faster processing.

The analytics server may also assign a numeric value for the coded customer attributes. For example, when the client request includes a coded value, such as the payment type as a control attribute, the analytics server may assign a zero to customers paying with a credit card and a one to customers paying with a debit card. In other examples, a client device may request specific numerical values for coded attributes. For example, the analytics server may be requested to assign a zero to customers with an age range of 18-30, assign a 0.5 to customers with an age range of 30-50, and assign a one to customers with an age range of 50+. The analytics server may use the same techniques as described above to normalize and discretize the coded attribute values.

At step 260, the analytics server may generate a third dataset by generating a space-filling curve using the normalized attributes as coordinates. A space-filling curve may be two-dimensional or three-dimensional or more. For example, a space-filling curve for two customer attributes may be a two-dimensional curve with the X-axis and the Y-axis each representing one attribute. In another example, a space-filling curve for three customer attributes may be a three-dimensional curve with the X-axis, the Y-axis, and the Z-axis each representing one attribute. A space-filling curve is a continuous fractal function whose domain and range are the unit interval [0, 1]. A person skilled in the relevant art will appreciate that the domain and range of the space-filling curve may be [0, 1] for a one-dimensional curve. In other instances, other space-filling curves (e.g., space-filling curves with more than one attribute or dimensions) may have different domains. For example, a space-filling curve may have a domain and range of $[0, 1]^K$, where K represents the number of attributes or dimensions associated with the space-filling curve. For the purposes of clarity and simplicity, the present disclosure only focuses on space-filling curve in one dimension. In an embodiment, the analytics server may use a Z-curve as a space-filling curve.

Figure 4:
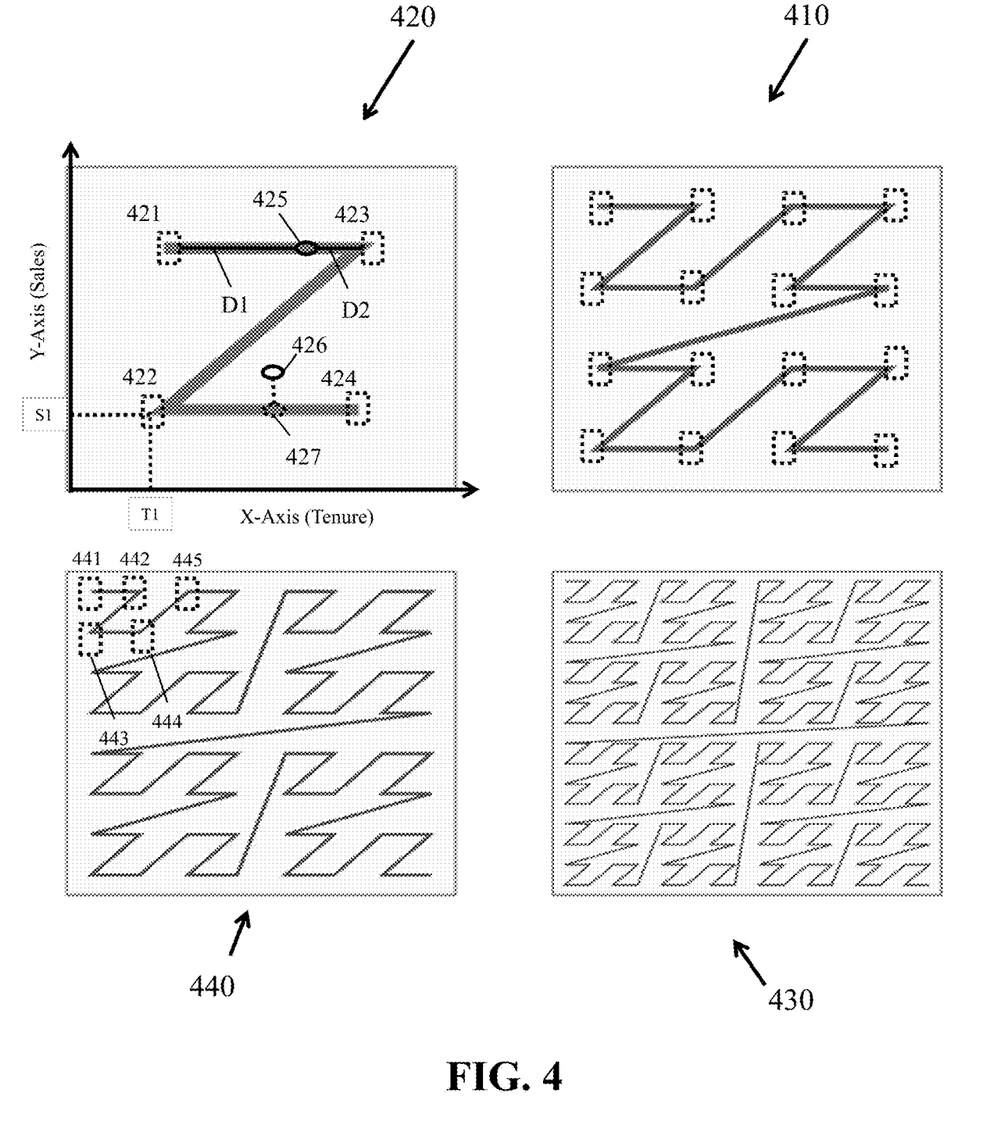
FIG. 4 illustrates space-filling curves, according to an embodiment.

FIG. 4 illustrates space-filling curves according to various embodiments. In the example embodiments, the space-filling curves are Z-curves, though it is intended that any space-filling curve, algorithm, or process can be used. Z-curves 410-440 are all different iterations of the same normalized customer attributes, shown in FIG. 4 with two customer attributes: tenure on the X-axis and sales on the Y-axis. The analytics server may generate the Z-curves based on the normalized customer attributes within the client request. For example, Z-curves illustrated within this example are all two-dimensional and all represent the same attributes (sales and tenure), which were designated within the client request. The number of dimensions for the Z-curve generated by the analytics server can be determined by the number of attributes within the client request. For example, if the client request contained tenure, sales, and median income, the analytics server would generate a three-dimensional Z-curve. One skilled in the relevant art will appreciate that in generating the Z-curves, the analytics server may also use any regression modeling technique to modify customer data points. For example, in some embodiment, the analytics server may use a regression technique, in addition to using the normalized data points, to project outlier data points on the space-filling curve. In other words, if a customer data point, is an outlier (e.g., the point is not on the Z-curve because the X-axis coordinate and the Y-Axis coordinate do not conform to the Z-pattern), the analytics server may manipulate the dataset using any regression techniques or a distance technique, such as the Euclidean distance or any other distance calculation method in the space of the Z-curves, to generate a new set of coordinates for the outlier data point. The Euclidean distance, as described and used herein, is the "ordinary" and "straight-line" distance between a two data points. For example, data point 426 is an outlier (e.g., is not on the Z-curve) because the attributes associated with the data point 426 do not conform to the Z-curve 420. In this example, the analytics server generates a new Y-axis coordinate value for data point 426. As a result, a new data point 427 is created on the Z-curve 420.

In some embodiments, the analytics server may generate additional Z-curves for the normalized customer attribute to achieve a higher precision. The precision level for a Z-curve may be determined by the number of bins within the Z-curve. A bin is a data point within the Z-curve, which corresponds to a fractal edge. For example, Z-curve 420 contains four bins (421-424.) Every bin may represent values of the attributes contained within the Z-curve and correspond to a number of customers. For example, bin 422 corresponds to T1 tenure on the X-axis and S1 sales on the Y-axis. Bin 422 also corresponds to a number of customers who possess the T1 tenure and the S1 sales attributes. The analytics server may assign every customer within the potential control dataset to each bin based on the number of bins and customer's proximity (distance) to the attribute values represented by each bin. For example, the analytics server may assign any customer within the potential control dataset who has T1 tenure and S1 sales (e.g., $100 purchased within the last year and have been a member for 2 years) to bin 422. In some embodiments, the analytics server may calculate a distance for each customer who does not possess the exact attribute values represented by the bins (e.g., a customer who has purchased $80 and/or has been a member of the client's business for 1.5 years) and assign said customer to the closest bin. The analytics server may, in some embodiments, use a distance calculation method to determine which bin to assign each customer. For example, data point 425 represents customers whose attribute values are between bin 421 and bin 423. The analytics server, in this example, may calculate the distance (e.g., Euclidean distance) between data point 425 and bin 421 (D1) and the distance (e.g., Euclidean distance) between data point 425 and bin 423 (D2). The analytics server may then assign the customers represented by data point 425 to the bin associated with the lesser of the two distances (e.g., D1 and D2). In this example, D2 is less than D1 and the analytics server assigns the customer associated with data point 425 to bin

423. A person skilled in the relevant art will appreciate that D1 and D2 are distances along the space of the space-filling curve.

In some embodiments, the analytics server may increase the precision of the generated Z-curve by increasing the number of bins. As customers are assigned to each bin within the generated Z-curve, it follows that an increase in the number of bins will yield a better distribution of customers. A Z-curve with a higher number of bins distributes the customers with a higher rate of precision. For example, and as illustrated in FIG. 4, Z-curves 410, 420, 430, and 440 are all generated using the same data. However, all contain different fractal geometry and different number of bins. While Z-curve 420 consists of four bins, Z-curve 410 consists of 16 bins. Z-curves 440 and 430 are other examples of even more precise Z-curves. In some embodiments, the client request may dictate the precision level of the Z-curves. For example, the user interface associated with the client device may present an option to the user to select a precision level for the control group dataset. The analytics server may then generate a Z-curve based on the precision level received from the client device.

Figure 5:
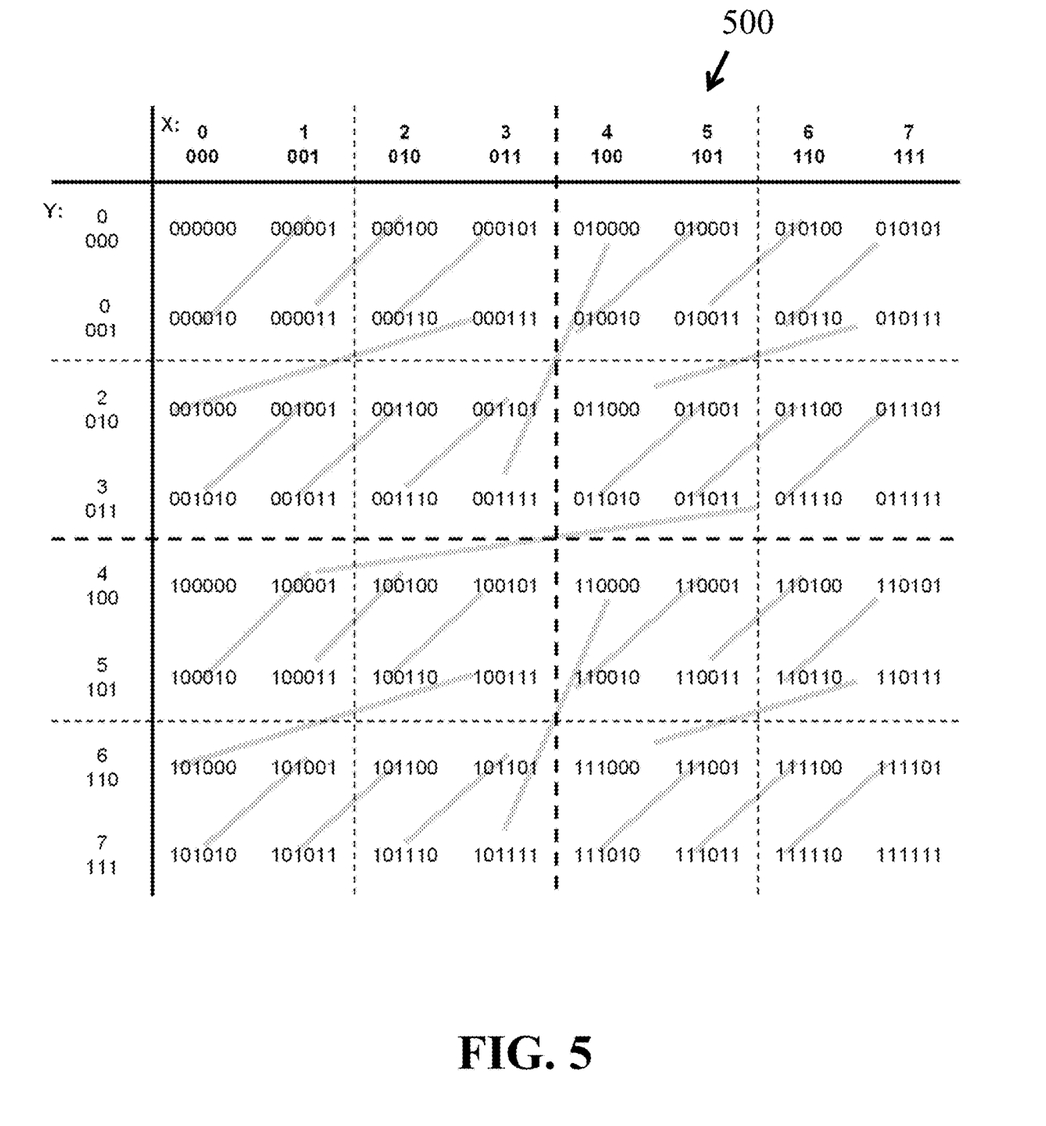
FIG. 5 illustrates generating and assigning binary values to a space-filling curve, according to an embodiment.

The analytics server may also generate a binary value for each Z-coordinate within the Z-curve. The analytics server may generate the binary value for each of the bins or other Z-coordinates within the Z-curve for faster processing (e.g., faster access to the bins) and efficient data storage. In some embodiments, the analytics server may generate and assign the binary values to each bin within a Z-curve based a Z-order (e.g., an order that follows the shape of the Z-curve). FIG. 5 illustrates a binary index 500 for the Z-curve 440. In this embodiment, the binary value generated and assigned to each bin follows the shape of the Z-curve 440. For example, bin 441 is designated as the 0th Z-order bin and is assigned a binary value of 000000, bin 442 is designated at the first Z-order bin and is assigned a binary value of 000001, bin 443 is designated at the first Z-order bin and is assigned a binary value of 000010, bin 444 is designated at the first Z-order bin and is assigned a binary value of 000011, and bin 445 is designated as the fourth Z-order bin and is assigned a binary value of 000100.

Referring back to FIG. 2, at step 270, the analytics server may determine control group customers based on the space-filling curve. The analytics server, using the space-filling curves, may determine the customers who most resemble the test customers along the attributes requested by the client within the client request. In an embodiment, the analytics server may match the bin within the space-filling curve with the attributes within the client request by determining corresponding values within the space-filling curve. For example, as illustrated in FIG. 4, bin 421 represents an attribute on the X-axis (e.g., tenure) and another attribute on the Y-axis (e.g., sales). The analytics server may determine the bin 421 satisfies a pre-determined attribute threshold (e.g., satisfies attribute received within the client request). The analytics server may generate the control group dataset comprising customers associated with the bin 421. In some embodiments, bin 421 may be associated with more than one customer and analytics server may chose all the customers associated with the data point as a control group customer.

The analytics server may determine whether the number of customers within the generated control group dataset satisfy the client request. In some embodiment, a bin within the Z-curve may not be associated with enough customers. For example, the client request may require 100 customers, and the bin associated with the customer attributes may only contain 80 customers. The analytics server may search for a "closest neighbor bin" by determining the distance between the bin and other bins along the space of the Z-Curve. The analytics server may identify the closest neighbor bin and determine 20 more customers for the control group dataset in order to satisfy the client request. If the number of customers within the control group dataset is still less than the number required by the client request, the analytics server may iteratively repeat the same process by re-calculating the closest neighbor bin until a satisfactory number of customers is determined. For example, if bin 421 satisfies the client request but is not associated with enough customers, the analytics server may choose customers from bin 423 to satisfy the client request. In yet another embodiment, the analytics server may iteratively adjust the attributes and re-generate the control group dataset in order to achieve a satisfactory number of customers. For example, in response to a client request to generate a control group dataset with 100 customers with 2.0 years of tenure and $100 in sales, the analytics server may first generate a control group dataset based on this criteria and if the number of the customers within the control group dataset is unsatisfactory, the analytics server may then adjust the tenure to 2.1 years, recalculate, and supplement the control group dataset. The analytics server may continue this process as many times as necessary in order to reach a satisfactory number of customers. The analytics server may adjust the customer attributes based on a pre-determined threshold, which may be received from the user interface. In yet another embodiment, the analytics server may after a pre-determined number of iterative calculations, determine the customers for the control group dataset at random.

If a customer is missing a value for any of the attributes stated above (e.g., numeric or coded attributes), the analytics server may generate a new set of attributes indicating the data deficiency. For example, if a customer within the potential control dataset is missing an attribute, the analytics server may generate a new coded attribute for all the customers within the potential control dataset and assign a zero to the customers with an information deficiency and a one to customer without information deficiency. The analytics server may then re-generate the control dataset using the newly created coded attribute in addition to the attributes within the client request. For instance, and continuing with the embodiment described above, the analytics server may create a three-dimensional Z-curve with three attributes (e.g., new coded missing attribute, tenure, and sales). The analytics server may create a Z-curve with any number of attributes.

In some embodiments, the analytics server may further generate and transmit an instruction to the client device to display the control group dataset, the Z-curves, or other information associated with the customers within the control group dataset. For example, the analytics server may instruct the client device to display the graph illustrated in FIG. 3, which indicates the distribution of customers within the potential control dataset (e.g., function 310) and the control group customers (e.g., function 320) or instruct the client device to display any of the Z-curves illustrated within FIG. 4. The display on the client device may comprise an interactive portion, where the client interacting with the user interface of the client device may be able to modify one or more parameters such as the precision level, number of bins, test group dataset, control group attributes, or the control group dataset.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   retrieving, by a server, a set of data points where each data point has a corresponding user and at least one user attribute;
   normalizing, by the server, the user attribute for each data point;
   generating, by the server, a second set of data points where each data point within the second set of data points corresponds to a normalized user attribute;
   generating, by the server, a multi-dimensional space-filling curve having at least a first edge and a second edge;
   generating, by the server, a first subset of the second set of data points, where each data point within the first subset has a distance between its normalized user attribute and the first edge of the multi-dimensional space-filling curve that satisfies a threshold;
   generating, by the server, a second subset of the second set of data points, where each data point within the second subset has a distance between its normalized user attribute and the second edge of the multi-dimensional space-filling curve that satisfies the threshold; and
   displaying, by the server on a graphical user interface displayed on an electronic client device, an indication for each data point within the first subset and the second subset of the second set of data points.

2. The method of claim 1, wherein normalizing the user attributes comprises normalizing a value associated with each user attribute into a uniform range between 0 and 1.

3. The method of claim 1, wherein a number of the data points within at least one of the first subset and the second subset of the second set of data points is received from the client electronic device.

4. The method of claim 3, further comprising:
   determining, by the server, whether a number of data points within the at least one of the first subset and the second subset of the second set of data points satisfies the number of data points received from the client electronic device; and
   in response to the number of data points not satisfying the number of data points received from the client electronic device, adding, by the server, another data point to at least one of the first subset and the second subset of the second set of data points using an adjusted threshold.

5. The method of claim 4, wherein the server adjusts the threshold by a predetermined amount.

6. The method of claim 4, wherein an adjustment value to the threshold is received, by the server.

7. The method of claim 1, wherein the server identifies a data point associated with each edge of the multi-dimensional space-filling curve by determining a closest neighbor data points to each edge.

8. The method of claim 1, wherein the distance corresponds to an attribute difference between each edge of the multi-dimensional space-filling curve and each data point within the second set of data points.

9. The method of claim 1, where each dimension of the multi-dimensional space-filling curve corresponds to an attribute of each data point.

10. The method of claim 1, wherein user attributes are at least one of tenure, age, purchase power, and income.

11. A computer system comprising:
a database configured to store a set of nodes;
an electronic client device configured to display a graphical user interface where a user can interacts with the graphical user interface to submit requests and view results;
a server in communication with the database and the electronic client device, the server configured to:
retrieve, from the database, a set of data points where each data point has a corresponding user and at least one user attribute;
normalize the user attribute for each data point;
generate a second set of data points where each data point within the second set of data points corresponds to a normalized user attribute;
generate a multi-dimensional space-filling curve having at least a first edge and a second edge;
generate a first subset of the second set of data points, where each data point within the first subset has a distance between its normalized user attribute and the first edge of the multi-dimensional space-filling curve that satisfies a threshold;
generate a second subset of the second set of data points, where each data point within the second subset has a distance between its normalized user attribute and the second edge of the multi-dimensional space-filling curve that satisfies the threshold; and
display, on the graphical user interface displayed on the electronic client device, an indication for each data point within the first subset and the second subset of the second set of data points.

12. The computer system of claim 11, wherein normalizing the user attributes comprises normalizing a value associated with each user attribute into a uniform range between 0 and 1.

13. The computer system claim 11, wherein a number of the data points within at least one of the first subset and the second subset of the second set of data points is received from the client electronic device.

14. The computer system of claim 13, where the server is further configured to:
determine whether a number of data points within the at least one of the first subset and the second subset of the second set of data points satisfies the number of data points received from the client electronic device; and
in response to the number of data points not satisfying the number of data points received from the client electronic device, add another data point to at least one of the first subset and the second subset of the second set of data points using an adjusted threshold.

15. The computer system of claim 14, wherein the server adjusts the threshold by a predetermined amount.

16. The computer system of claim 14, wherein an adjustment value to the threshold is received, by the server.

17. The computer system of claim 11, wherein the server identifies a data point associated with each edge of the multi-dimensional space-filling curve by determining a closest neighbor data points to each edge.

18. The computer system of claim 11, wherein the distance corresponds to an attribute difference between each edge of the multi-dimensional space-filling curve and each data point within the second set of data points.

19. The computer system of claim 11, where each dimension of the multi-dimensional space-filling curve corresponds to an attribute of each data point.

20. The computer system of claim 11, wherein user attributes are at least one of tenure, age, purchase power, and income.

* * * * *